US010837801B2

(12) United States Patent
Moriya et al.

(10) Patent No.: US 10,837,801 B2
(45) Date of Patent: Nov. 17, 2020

(54) WIRELESS POWER SUPPLY FOR VEHICLE

(71) Applicant: SUBARU CORPORATION, Tokyo (JP)

(72) Inventors: Fumiyuki Moriya, Tokyo (JP); Takuya Horie, Tokyo (JP); Tomofumi Okamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 171 days.

(21) Appl. No.: 16/162,723

(22) Filed: Oct. 17, 2018

(65) Prior Publication Data

US 2019/0154465 A1 May 23, 2019

(30) Foreign Application Priority Data

Nov. 22, 2017 (JP) ................. 2017-224215

(51) Int. Cl.
| | | |
|---|---|---|
| *G01D 5/14* | (2006.01) | |
| *B60L 3/00* | (2019.01) | |
| *G01B 7/30* | (2006.01) | |
| *B60W 20/50* | (2016.01) | |
| *B60W 10/08* | (2006.01) | |

(Continued)

(52) U.S. Cl.
CPC ............ *G01D 5/145* (2013.01); *B60L 3/0038* (2013.01); *B60W 10/08* (2013.01); *B60W 20/50* (2013.01); *G01B 7/30* (2013.01); *B60L 2240/421* (2013.01); *B60W 30/18109* (2013.01); *B60W 2050/021* (2013.01)

(58) Field of Classification Search
CPC .......... G01D 5/145; G01D 5/204; G01D 3/08; B60L 3/0038; B60L 2240/421; G01B 7/30; B60W 20/50; B60W 10/08; B60W 2050/021; B60W 30/18109
See application file for complete search history.

(56) References Cited

U.S. PATENT DOCUMENTS

| | | | |
|---|---|---|---|
| 2013/0090795 A1* | 4/2013 | Luke .................... | G07C 5/0858 |
| | | | 701/22 |
| 2016/0257222 A1 | 9/2016 | Nakagawa | |
| 2016/0355095 A1* | 12/2016 | Okamoto ............... | B60L 53/65 |

FOREIGN PATENT DOCUMENTS

| | | |
|---|---|---|
| JP | 2002-136171 A | 5/2002 |
| JP | 2012-010551 A | 1/2012 |
| JP | 2013-115877 A | 6/2013 |

(Continued)

OTHER PUBLICATIONS

Japanese Notice of Reasons for Refusal issued in corresponding Japanese Patent Application No. 2017-224215, dated Oct. 23, 2019, with English translation.

*Primary Examiner* — Marthe Y Marc-Coleman
(74) *Attorney, Agent, or Firm* — McDermott Will & Emery LLP

(57) ABSTRACT

A vehicle includes: a traction motor; and a drive controller. The traction motor includes a rotational position sensor configured to detect a rotational position of a rotor magnetically. The drive controller controls a driving current output to the traction motor. The drive controller is able to switch a control mode of the driving current between a sensing control mode configured to control the driving current by using a detection result from the rotational position sensor and a sensing-less control mode configured to control the driving current without using a detection result from the rotational position sensor.

7 Claims, 9 Drawing Sheets

(51) Int. Cl.
 *B60W 50/02* (2012.01)
 *B60W 30/18* (2012.01)

(56) References Cited

FOREIGN PATENT DOCUMENTS

| | | |
|---|---|---|
| JP | 2015-008558 A | 1/2015 |
| JP | 2016-164036 A | 9/2016 |
| JP | 2017-005958 A | 1/2017 |
| JP | 6156605 B1 | 7/2017 |
| WO | 2014/156656 A1 | 10/2014 |

* cited by examiner

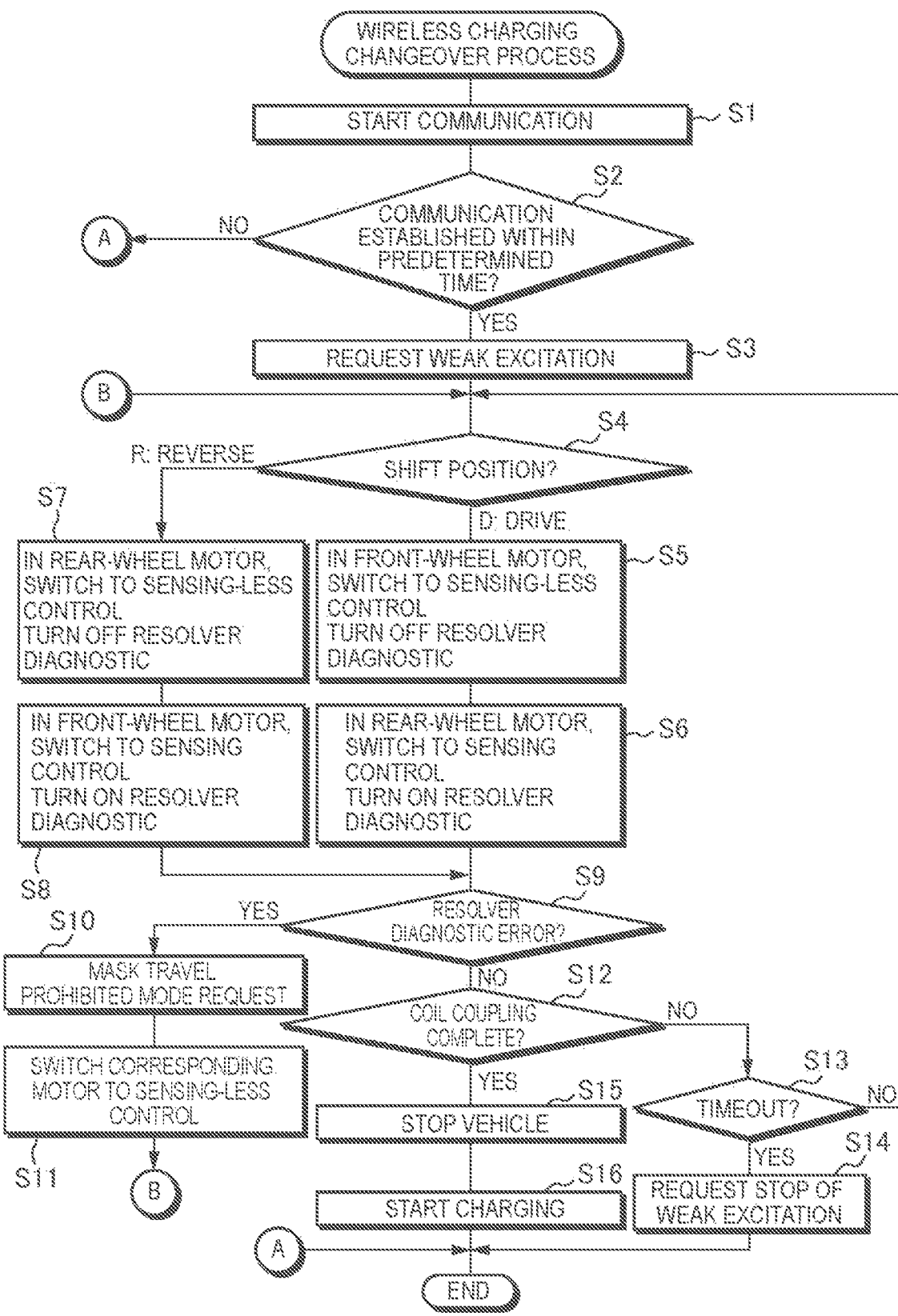

WIRELESS POWER SUPPLY FOR VEHICLE

CROSS-REFERENCE TO RELATED APPLICATIONS

The present application claims priority from Japanese Patent Application No. 2017-224215 filed on Nov. 22, 2017, the entire contents of which are hereby incorporated by reference.

BACKGROUND

1. Technical Field

The present invention relates to a vehicle provided with a traction motor that includes a rotational position sensor.

2. Related Art

In the past, wireless charging systems have been investigated, in which a receiving coil is provided in a vehicle while a supplying coil is provided in ground equipment, power is transferred wirelessly from the supplying coil to the receiving coil while both coils are made to face each other, and a high-voltage battery in the vehicle is charged. In a wireless charging system, before transferring power, a process of weakly exciting the supplying coil and positioning the receiving coil to raise the coupling strength between the supplying coil and the receiving coil while measuring the coupling strength is anticipated. During the positioning, the position of the receiving coil is adjusted by moving the vehicle according to driving operations by the driver, automatic driving, or the like.

As a related technology to the present technology, Japanese Unexamined Patent Application Publication (JP-A) No. 2017-005958 discloses a technology for controlling a vehicle when positioning a receiving coil of the vehicle with a supplying coil in a wireless charging system. Also, for a vehicle provided with multiple traction motors, JP-A No. 2005-184610 discloses technology regarding how to control the other traction motor or motors when the torque of any traction motor falls contrary to a command.

SUMMARY OF THE INVENTION

An aspect of the present invention provides a vehicle including: a traction motor including a rotational position sensor configured to detect a rotational position of a rotor magnetically; and a drive controller configured to control a driving current output to the traction motor. The drive controller is able to switch a control mode of the driving current between a sensing control mode configured to control the driving current by using a detection result from the rotational position sensor and a sensing-less control mode configured to control the driving current without using a detection result from the rotational position sensor.

BRIEF DESCRIPTION OF THE DRAWINGS

FIG. 3 is a flowchart illustrating a procedure of a wireless charging changeover process.

DETAILED DESCRIPTION

In the following, some preferred examples of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following example examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

The inventors have discovered an issue in which, when moving a vehicle to position a receiving coil and a supplying coil, if the magnetic field of the weakly excited supplying coil acts on the traction motor of the vehicle, a diagnostic error may be induced in a rotational position sensor of the traction motor. If a diagnostic error occurs in the rotational position sensor, ordinarily, not only is the driving of the traction motor prohibited, but as a failsafe, the vehicle is put into an undriveable state such as by cutting off a high-voltage battery from the system. For this reason, wireless charging becomes difficult.

JP-A No. 2017-005958 and JP-A No. 2005-184610 do not mention the above issue or describe technology for addressing this issue.

Also, to address the above issue, a configuration that shields the underside of the traction motor with a shielding plate that blocks magnetic fields, such as a steel plate, may be considered. However, this configuration creates the issues of increased weight of the vehicle and higher component costs due to the shielding plate.

Also, this problem, namely the traction motor becoming undriveable even though the traction motor is functioning normally when a diagnostic error occurs in the rotational positioning sensor, is not limited to occurring when positioning the receiving coil, and may also occur when the traction motor is exposed to an external magnetic field.

An objective of the present invention is to provide a vehicle that is able to keep driving the traction motor even when an abnormality occurs in the rotational position sensor of the traction motor.

Example 1

Figure 1:
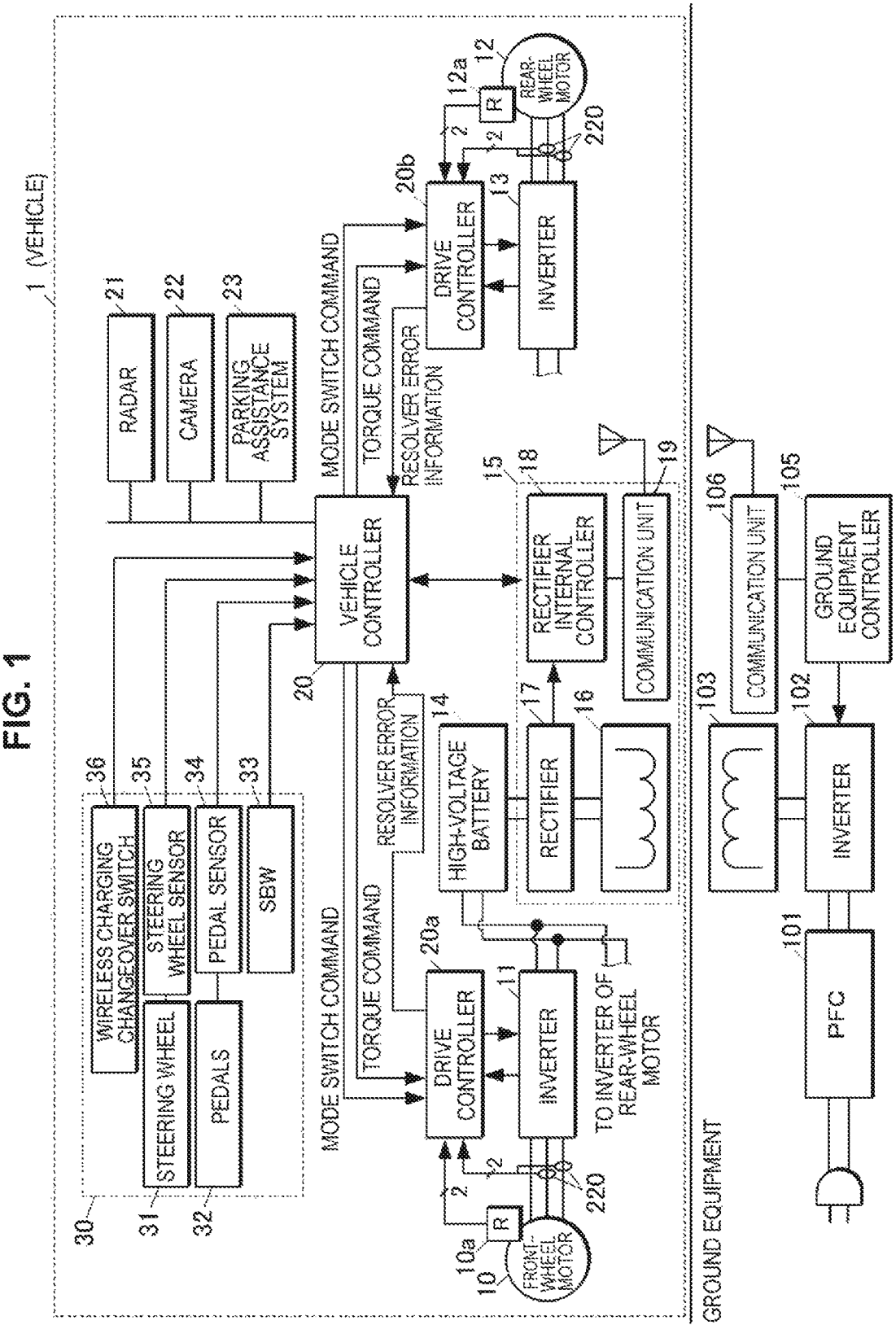
FIG. 1 is a block diagram illustrating a vehicle and ground equipment according to Example 1 of the present invention.

FIG. 1 is a block diagram illustrating a vehicle and ground equipment according to Example 1 of the present invention.

The vehicle 1 of Example 1 is an electric vehicle (EV) capable of wireless charging that includes two traction motors (a front-wheel motor 10 and a rear-wheel motor 12). As illustrated in FIG. 1, the vehicle 1 is provided with the front-wheel motor 10 that drives the front wheels, the rear-wheel motor 12 that drives the rear wheels, inverters 11 and 13 that drive the front-wheel motor 10 and the rear-wheel motor 12, and a high-voltage battery 14 that stores and supplies power for traction. Also, the vehicle 1 is provided with a wireless charging unit 15, an operation unit 30 that receives driving operations and the like by the driver, a vehicle controller 20 that controls the vehicle 1, and drive controllers 20a and 20b that control the driving of the inverters 11 and 13. Additionally, a radar 21, a camera 22, and a parking assistance system 23 for confirming conditions around the vehicle 1 when parking and the like are provided in the vehicle 1. The parking assistance system 23 includes an automatic driving function that causes the vehicle 1 to move to a predetermined parking space on the basis of output from the radar 21 and an image from the camera 22. In one example, among the above configuration elements, the front-wheel motor 10 and the rear-wheel motor 12 correspond to one instance of a traction motor, the vehicle controller 20 corresponds to one instance of a first mode controller and a second mode controller, and the high-voltage battery 14 corresponds to one instance of a battery.

The wireless charging unit 15 is provided with a receiving coil 16 that receives power wirelessly, and a rectifier 17 that rectifies alternating current flowing through the receiving coil 16 to supply charging current to the high-voltage battery 14. Also, the wireless charging unit 15 is provided with a communication unit 19 for wirelessly communicating (such as by Wi-Fi communication, for instance) with the source of the power, namely ground equipment, and a rectifier internal controller 18 that controls wireless power transfer. The receiving coil 16 is disposed on the bottom of the vehicle 1, between the front wheels and the rear wheels in the longitudinal direction of the vehicle 1.

The operation unit 30 is provided with a steering wheel (handle) 31 and corresponding steering wheel sensor 35, pedals 32 such as brake and accelerator pedals and a corresponding pedal sensor 34, a shift by wire (SBW) 33, and a wireless charging changeover switch 36. The SBW 33 is a system that inputs gear shift operations by the driver electronically. A signal indicating the shift position is transmitted from the SBW 33 to the vehicle controller 20. The wireless charging changeover switch 36 is operable by the driver, and is a switch by which the driver notifies the vehicle 1 to start positioning the vehicle 1 before wireless charging.

The vehicle controller 20 executes steering control of the vehicle 1 as well as driving control of the front-wheel motor 10 and the rear-wheel motor 12 according to outputs from the SBW 33 and the sensors 34 and 35. Drive control is realized by the vehicle controller 20 controlling the output of the inverters 11 and 13 via the drive controllers 20a and 20b. By these controls, the vehicle 1 travels in accordance with driving operations by the driver. Also, the vehicle 1 travels by torque from the front-wheel motor 10 and the rear-wheel motor 12 produced in a ratio according to a travel state or a set state.

In addition, the vehicle controller 20 includes a function of receiving any error information input about the vehicle 1, and causing the vehicle 1 to transition to a failsafe mode when a predetermined error occurs. The failsafe mode includes a travel prohibited mode that prohibits the travel of the vehicle 1, a high-speed travel prohibited mode that allows travel of the vehicle 1 only at low speeds, and the like. Except for special cases, normally the vehicle controller 20 causes the vehicle 1 to switch to the travel prohibited mode on the basis of a resolver error occurring.

The ground equipment is provided with a supplying coil 103 that transmits power wirelessly, as well as a power factor correction (PFC) 101, an inverter 102, and the like that receive power from an electric power system and pass current to the supplying coil 103. Additionally, the ground equipment is provided with a communication unit 106 that communicates wirelessly with the vehicle 1 during wireless charging, and a ground equipment controller 105 that drives the inverter 102 in cooperation with the vehicle 1 to excite the supplying coil 103.

Resolvers 10a and 12a that detect the rotational position are provided in the front-wheel motor 10 and the rear-wheel motor 12, respectively. In one example, the resolvers 10a and 12a correspond to an instance of a rotational position sensor. The resolvers 10a and 12a respectively detect the rotational positions of the front-wheel motor 10 and the rear-wheel motor 12 using magnetism. By controlling the inverters 11 and 13 according to these rotational positions, the drive controllers 20a and 20b are able to drive the front-wheel motor 10 and the rear-wheel motor 12 at high efficiencies, and cause a desired torque to be output from the front-wheel motor 10 and the rear-wheel motor 12. The front-wheel motor 10 and the resolver 10a are disposed closer to the front wheels than the body center, while the rear-wheel motor 12 and the resolver 12a are disposed closer to the rear wheels than the body center.

Figure 2:
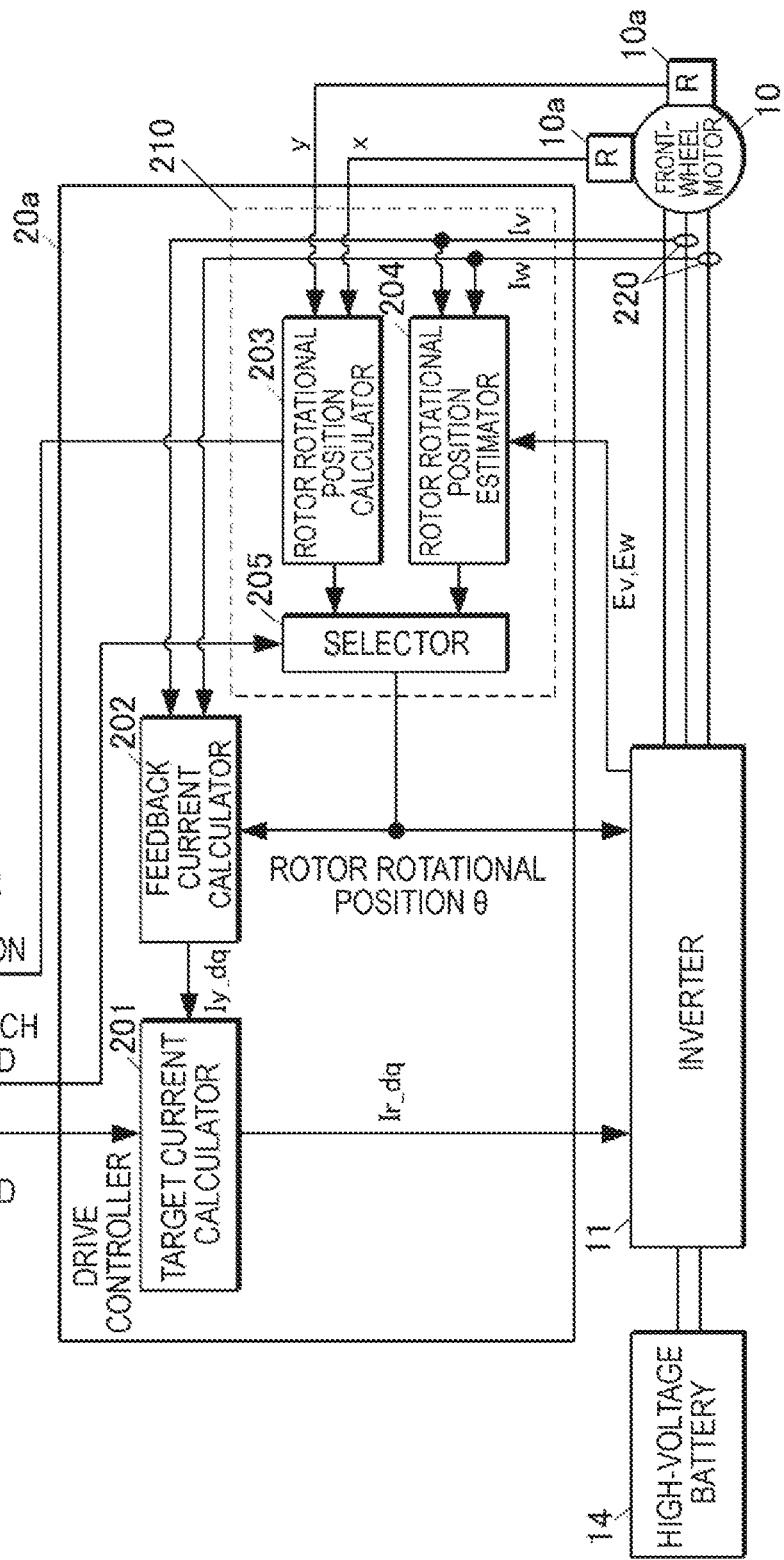
FIG. 2 is a configuration diagram illustrating the drive controller and surrounding configuration in FIG. 1.

FIG. 2 is a configuration diagram illustrating the drive controller and surrounding configuration in FIG. 1.

The drive controller 20a receives a torque command of the vehicle controller 20, and controls the output current of the inverter 11 such that the requested torque is output from the front-wheel motor 10. To execute such control, the drive controllers 20a and 20b include a target current calculator 201, a feedback current calculator 202, and a rotational position acquirer 210 that acquires and reports information about the rotor rotational position θ of the front-wheel motor 10. Also, the output (x, y) of the resolver 10a and current output values (Iv, Iw) of the inverter 11 detected by a current sensor 220 are input into the drive controller 20a.

The target current calculator 201 and the feedback current calculator 202 drive the inverter 11 by executing vector control using dq coordinates that rotate synchronously with the rotating magnetic field of the front-wheel motor 10. Specifically, the feedback current calculator 202 receives the current output values (Iv, Iw) of the three-phase current of the inverter 11 and the rotor rotational position θ as input, calculates the present current output value Iy_dq in dq coordinates, and provides the calculated result as feedback to the target current calculator 201. The target current calculator 201 receives the torque command and the feedback current output value Iy_dq as input from the vehicle controller 20. Additionally, the target current calculator 201 executes a feedback control such that torque corresponding to the torque command is obtained, and computes a target current value Ir_dq in dq coordinates. For the above feedback control, proportional-integral (PI) control, proportional-integral-derivative (PID) control, or the like is applied, for instance. The inverter 11 receives the target current value Ir_dq and the rotor rotational position θ, calculates three-phase voltage output values (Eu, Ev, Ew) for outputting the target current value Ir_dq, and drives semiconductor switches such that the calculated result is output. By such action, the front-wheel motor 10 is driven in accordance with the torque command from the vehicle controller 20.

The rotational position acquirer 210 includes a rotor rotational position calculator 203, a rotor rotational position estimator 204, and a selector 205, and outputs a rotor rotational position θ based on the output of the resolver 10a or a rotor rotational position θ that is estimated without using the output of the resolver 10a. The rotational position acquirer 210 outputs the rotor rotational position θ to the feedback current calculator 202 and the inverter 11.

The rotor rotational position calculator 203 receives the output values (x, y) of the resolver 10a of the front-wheel motor 10, and calculates the rotor rotational position θ. Whereas the output value x of the resolver 10a varies in proportion to the sine curve "sin θ" corresponding to the rotor rotational position θ, the other output value y of the resolver 10a varies in proportion to the cosine curve "cos θ" corresponding to the rotor rotational position θ. Consequently, the rotor rotational position calculator 203 is able to use a predetermined calculation formula to calculate the rotor rotational position θ.

Additionally, the rotor rotational position calculator 203 continuously executes a diagnostic process to determine whether the output values (x, y) of the resolver 10a are abnormal. If the sum of the squares of the output values (x, y) are normal, the rotor rotational position θ becomes a fixed value regardless of the angular position. However, in the case in which the resolver 10a is exposed to an external magnetic field or the like, for instance, the sum of the squares of the output values (x, y) will diverge greatly from the fixed value in some cases. As the diagnostic process, for instance, the rotor rotational position calculator 203 computes the sum of the squares of the output values (x, y) and the discrepancy of this sum of squares from an ideal value, and determines whether the discrepancy has reached or exceeded a threshold. Additionally, if the threshold is reached or exceeded, an abnormality is determined to exist, and the rotor rotational position calculator 203 outputs resolver error information to the vehicle controller 20. This monitoring of the output from the resolver 10a is called "resolver diagnostic", and the case of an abnormal diagnostic result is called a "resolver error".

The rotor rotational position estimator 204 receives the current output values (Iv, Iw) of the three-phase current of the inverter 11 and the voltage output values (Ev, Ew) of the three-phase current of the inverter 11 as input, and uses these values to estimate the rotor rotational position θ of the front-wheel motor 10. As a specific instance, first, the rotor rotational position estimator 204 defines an estimated rotor rotational position θ' and estimated synchronous rotation axis coordinates d'q'. Subsequently, the rotor rotational position estimator 204 uses the detected current output values (Iv, Iw) to compute an estimated voltage value E'_d'q' on the d'q' axes. Also, the rotor rotational position estimator 204 uses the actual voltage output values (Ev, Ew) to compute a voltage output value E_d'q' on the d'q' axes. Furthermore, the rotor rotational position estimator 204 executes, for instance, a proportional-integral (PI) compensation operation on the estimated rotor rotational position θ' such that the differential voltage between the estimated voltage value E'_d'q' and the voltage output value E_d'q' becomes zero. With this arrangement, the defined synchronous rotation coordinate d'q' axes converge on the actual synchronous rotation coordinate dq axes, and the estimated rotor rotational position θ' converges on the actual rotor rotational position θ. Therefore, a rotor rotational position θ' in good agreement with the actual value is obtained, and the rotor rotational position estimator 204 outputs the rotor rotational position θ' as an estimated value. Note that the estimation method given herein is one publicly known method of estimating the rotor rotational position θ. Other publicly known estimation methods may also be applied as the estimation method executed by the rotor rotational position estimator 204.

The selector 205 outputs one of the output from the rotor rotational position calculator 203 and the output from the rotor rotational position estimator 204 to the feedback current calculator 202 and the inverter 11. The selector 205 switches the value to output in accordance with a mode toggle command of the vehicle controller 20.

Mode toggle commands of the vehicle controller 20 include a command regarding a sensing control mode and a command regarding a sensing-less control mode. The sensing control mode is a mode that drives the inverter 11 using the detection result of the resolver 10a, while the sensing-less control mode is a mode that drives the inverter 11 without using the detection result of the resolver 10a. The selector 205 passes the output of the rotor rotational position calculator 203 according to the sensing control mode command, and passes the output of the rotor rotational position estimator 204 according to the sensing-less control mode command.

The drive controller 20b that controls the driving of the rear-wheel motor 12 and the inverter 13 is configured similarly to the drive controller 20a in FIG. 2.

<Wireless Charging Changeover Process>

FIG. 3 is a flowchart illustrating a procedure of a wireless charging changeover process executed by the vehicle controller 20.

The wireless charging changeover process is started by the vehicle controller 20 due to the driver turning on the wireless charging changeover switch 36. Normally, to charge the high-voltage battery 14, the driver turns on the wireless charging changeover switch 36 near the ground equipment, and once the wireless charging changeover process has started, the driver drives the vehicle 1 to adjust the position of the receiving coil 16 with respect to the supplying coil 103.

When the wireless charging changeover process is started, the vehicle controller 20 commands the rectifier internal controller 18 to start communication, thereby causing the communication unit 19 to start communication (step S1). First, the communication unit 19 establishes communication with the communication unit 106 of the ground equipment, and starts communication. The vehicle controller 20 determines whether the communication unit 19 has established communication within a predetermined time (step S2). If communication has been established, the flow proceeds to the next step, but if there is a timeout, the wireless charging changeover process ends on an error. Normally, communication is established within the predetermined time if the vehicle 1 is close to the ground equipment, but if the vehicle 1 is distant from the ground equipment, communication is not established and a timeout occurs.

When communication has been established, the vehicle controller 20 issues a weak excitation request to the ground equipment by wireless communication (step S3). Specifically, the vehicle controller 20 outputs the command for a weak excitation request to the rectifier internal controller 18, and the rectifier internal controller 18 issues a weak excitation request to the ground equipment controller 105 through wireless communication by the communication unit 19.

The weak excitation request is a request for inducing a weak excitation used for positioning with respect to the supplying coil 103 of the ground equipment. By the weak excitation, the rectifier internal controller 18 detects the coupling strength between the supplying coil 103 and the receiving coil 16, and in the case in which the coupling strength exceeds a predetermined threshold, the rectifier internal controller 18 is able to determine that coupling is complete, and the receiving coil 16 and the supplying coil 103 are positioned correctly.

Next, the vehicle controller 20 determines the current gear shift position on the basis of output from the SBW 33 (step S4). At this timing, the driver is operating the vehicle 1 to position the receiving coil 16 and the supplying coil 103, and if the supplying coil 103 is ahead, the shift position is set to "D: drive". Also, if the supplying coil 103 is behind, the shift position is set to "R: reverse".

If the result of determination in step S4 is that the shift position is "D: drive", the vehicle controller 20 causes the drive controller 20a of the front-wheel motor 10 to switch to the sensing-less control mode and switch off the resolver diagnostic (step S5). However, if the drive controller 20a is already in the above state, the state is left unchanged. The switch to the sensing-less control mode is achieved by the vehicle controller 20 outputting a mode switch command for the sensing-less control mode to the drive controller 20a. The switching off of the resolver diagnostic is achieved by the vehicle controller 20 masking (blocking) resolver error information in the drive controller 20a. Alternatively, in the case in which the rotor rotational position calculator 203 of the drive controller 20a includes a function of stopping the resolver diagnostic, the vehicle controller 20 may also issue a command to stop the resolver diagnostic of the rotor rotational position calculator 203, and thereby switch off the resolver diagnostic.

Additionally, the vehicle controller 20 causes the drive controller 20b of the rear-wheel motor 12 to switch to the sensing control mode and switch on the resolver diagnostic (step S6). However, if the drive controller 20b is already in the above state, the state is left unchanged. The switch to the sensing control mode is achieved by the vehicle controller 20 outputting a mode switch command for sensing control to the drive controller 20b. The switching on of the resolver diagnostic is achieved by the vehicle controller 20 canceling the masking of resolver error information in the drive controller 20b. In the case in which the rotor rotational position calculator 203 of the drive controller 20b includes a function of stopping the resolver diagnostic, the vehicle controller 20 may also issue a command to cancel the stopping the resolver diagnostic of the rotor rotational position calculator 203, and thereby switch on the resolver diagnostic.

On the other hand, if the result of determination in step S4 is that the shift position is "R: reverse", the vehicle controller 20 causes the drive controller 20b of the rear-wheel motor 12 to switch to the sensing-less control mode and switch off the resolver diagnostic (step S7). However, if the above state is already in effect, the state is left unchanged. Additionally, the vehicle controller 20 causes the drive controller 20a of the front-wheel motor 10 to switch to the sensing control mode and switch on the resolver diagnostic (step S8). However, if the above state is already in effect, the state is left unchanged.

In one example, the process of switching to the sensing control mode or the sensing-less control mode in steps S5 to S8 above corresponds to one example of a control action by a second mode controller.

Figure 4A:
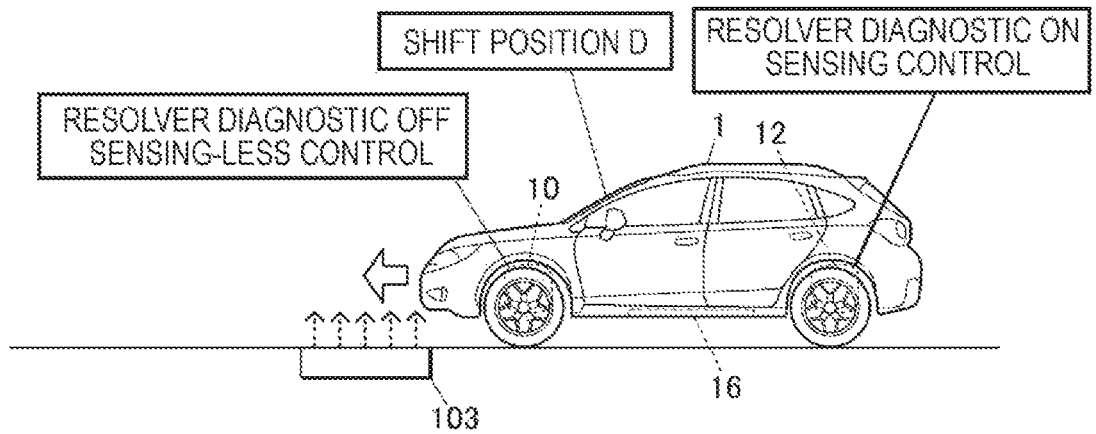
FIG. 4A is an explanatory diagram illustrating an instance of control mode switching, and illustrates a first stage of a receiving coil positioning operation.
Figure 4B:
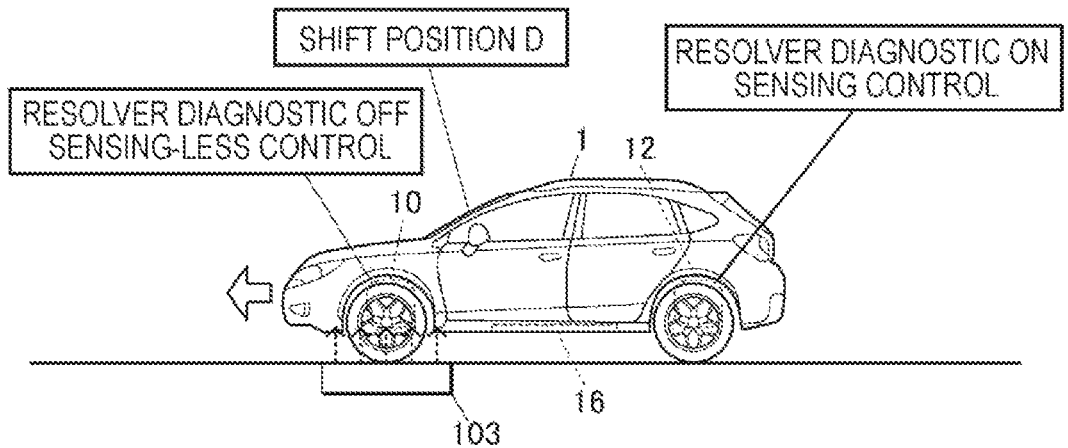
FIG. 4B is an explanatory diagram illustrating an instance of control mode switching, and illustrates a second stage of a receiving coil positioning operation.
Figure 4C:
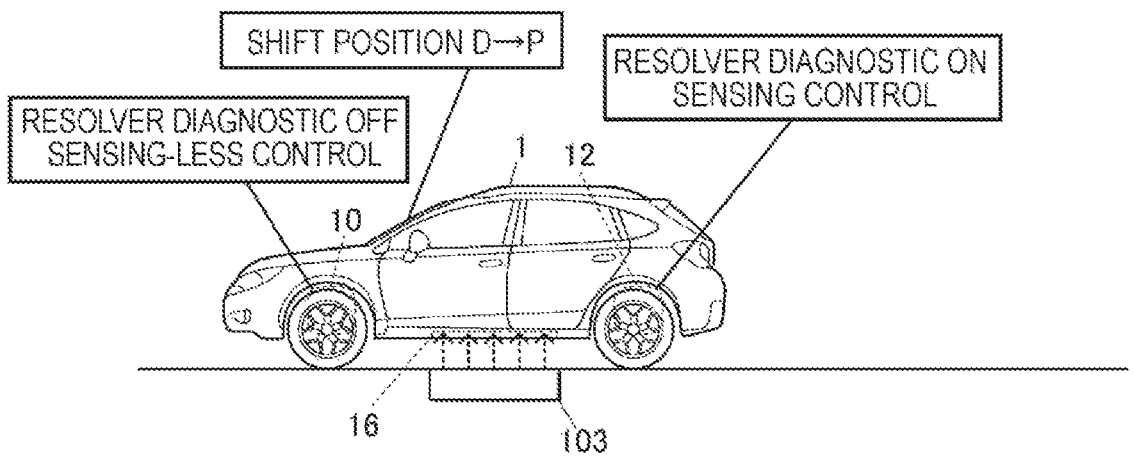
FIG. 4C is an explanatory diagram illustrating an instance of control mode switching, and illustrates a third stage of a receiving coil positioning operation.

FIGS. 4A to 4C are explanatory diagrams illustrating an instance of control mode switching, and illustrate a first stage to a third stage of a receiving coil positioning operation.

As described above, in the case in which the shift position is in drive during the positioning of the receiving coil 16, as illustrated in FIG. 4A, it is anticipated that the supplying coil 103 is positioned ahead of the receiving coil 16. In this case, during positioning, the front-wheel motor 10 and the resolver 10a pass through the magnetic field of the weakly excited supplying coil 103, whereas the rear-wheel motor 12 and the resolver 12a are apart from the magnetic field. Accordingly, in the process of the above steps S5 and S6, the control mode of the drive controllers 20a and 20b and the on/off state of the resolver diagnostic of the front-wheel motor 10 and the rear-wheel motor 12 are switched. With this arrangement, as illustrated in FIGS. 4B and 4C, during positioning, it becomes possible to drive the front-wheel motor 10 even if the front-wheel motor 10 passes through a magnetic field and the output of the resolver 10a becomes abnormal. Also, a situation in which a resolver error occurs and the vehicle 1 becomes undriveable is avoided.

Figure 5A:
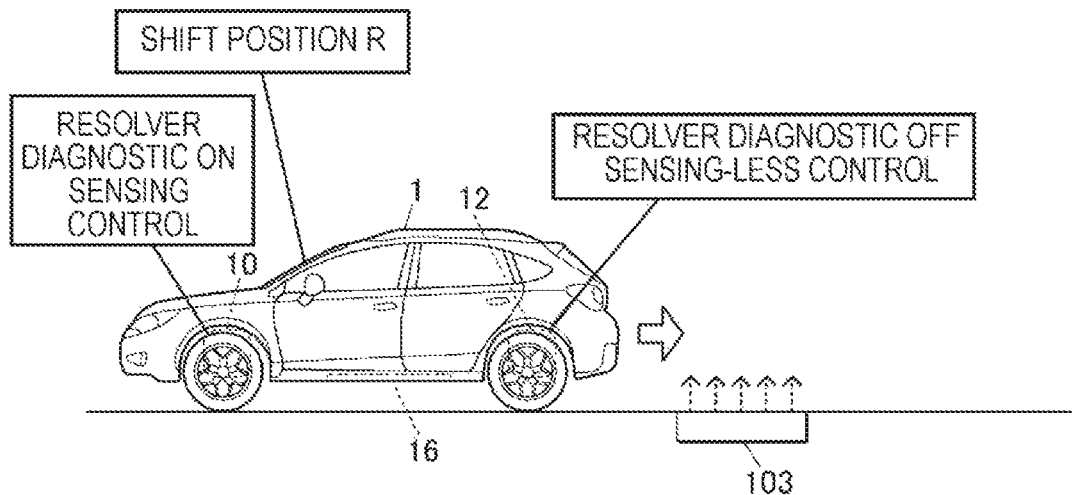
FIG. 5A is an explanatory diagram illustrating an instance of control mode switching, and illustrates a first stage of a receiving coil positioning operation.
Figure 5B:
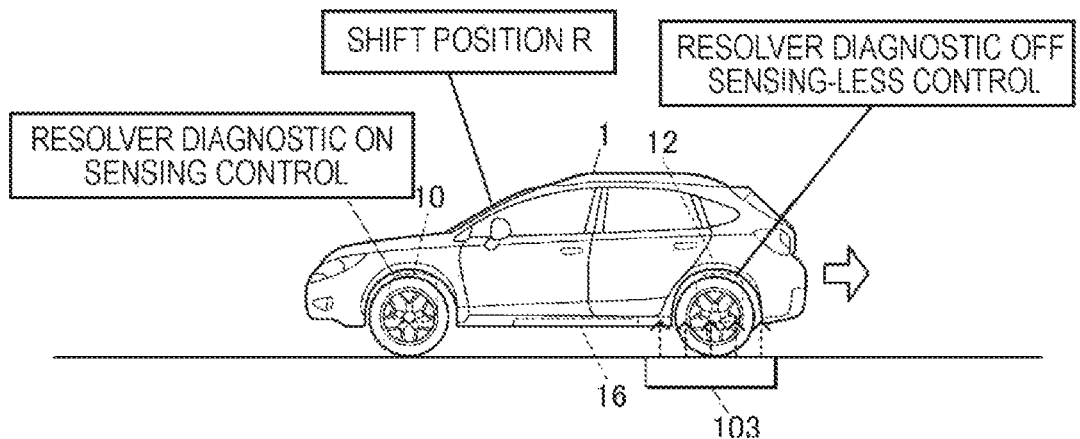
FIG. 5B is an explanatory diagram illustrating an instance of control mode switching, and illustrates a second stage of a receiving coil positioning operation.
Figure 5C:
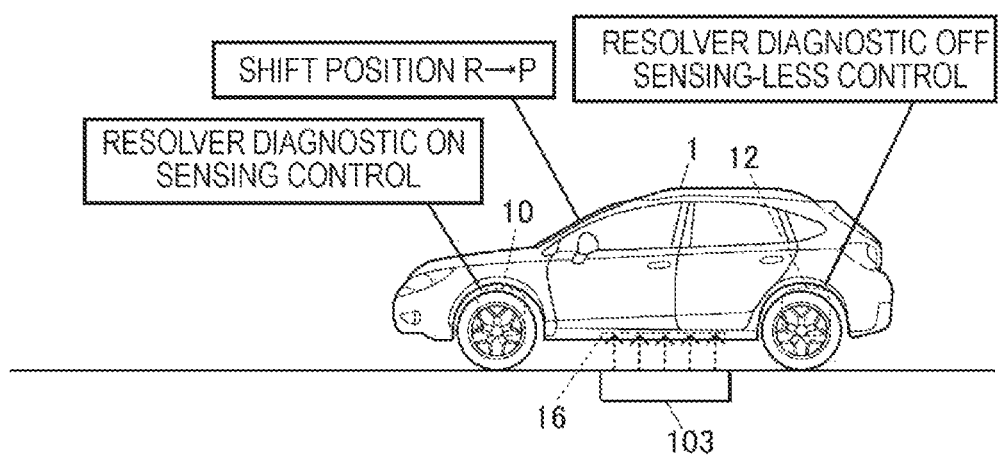
FIG. 5C is an explanatory diagram illustrating an instance of control mode switching, and illustrates a third stage of a receiving coil positioning operation.

FIGS. 5A to 5C are explanatory diagrams illustrating an instance of control mode switching, and illustrate a first stage to a third stage of a receiving coil positioning operation.

As described above, in the case in which the shift position is in reverse during positioning, as illustrated in FIG. 5A, it is anticipated that the supplying coil 103 is positioned behind the receiving coil 16. In this case, during positioning, the rear-wheel motor 12 and the resolver 12a pass through the magnetic field of the weakly excited supplying coil 103, whereas the front-wheel motor 10 and the resolver 10*a* are apart from the magnetic field. Accordingly, in the process of the above steps S7 and S8, the control mode of the drive controllers 20*a* and 20*b* and the on/off state of the resolver diagnostic of the front-wheel motor 10 and the rear-wheel motor 12 are switched. With this arrangement, as illustrated in FIGS. 5B and 5C, during positioning, it becomes possible to drive the rear-wheel motor 12 even if the rear-wheel motor 12 passes through a magnetic field and the output of the resolver 12*a* becomes abnormal. Also, a situation in which a resolver error occurs and the vehicle 1 becomes undriveable is avoided.

During the period of positioning of the receiving coil 16 through driving by the driver, a loop process including the above switching control (steps S4 to S13) is repeated.

During the loop process of steps S4 to S13, the vehicle controller 20 determines whether a resolver error has occurred (step S9). During the positioning of the receiving coil 16, the driver may drive forward or back up the vehicle 1 too much, and the resolver 10*a* or the resolver 12*a* with resolver diagnostic turned on may be exposed to the magnetic field of the supplying coil 103 in some cases. In such cases, a resolver error occurs, and the determination result in step S9 becomes YES.

If a resolver error occurs, normally the vehicle controller 20 internally issues a request for the travel prohibited mode to stop the driving of the front-wheel motor 10 and the rear-wheel motor 12. However, herein, the vehicle controller 20 first masks (renders invalid from a control standpoint) the request for the travel prohibited mode (step S10). Furthermore, the vehicle controller 20 causes the drive controller 20*a* of the front-wheel motor 10 or the drive controller 20*b* of the rear-wheel motor 12 where the resolver error occurred to switch the control mode to the sensing-less control mode (step S11), and returns the process to step S4. By the process of step S10, an undriveable state of the vehicle 1 occurring due to a resolver error may be suppressed, and in addition, by the process of step S11, the driving of the front-wheel motor 10 or the rear-wheel motor 12 may be continued even if a resolver error occurs. In one example, the above step S11 corresponds to one instance of a control action by a first mode controller.

Also, during the loop process of steps S4 to S13, the vehicle controller 20 determines whether the coupling between the receiving coil 16 and the supplying coil 103 is complete (step S12), and if coupling is incomplete, the vehicle controller 20 determines whether a predetermined time has elapsed to reach a timeout (step S13). The determination of whether coupling is complete is achieved specifically by having the rectifier internal controller 18 detect the current in the rectifier 17 based on the weak excitation of the supplying coil 103, and in the case in which the current value exceeds a threshold indicating complete coupling, the vehicle controller 20 is notified. The state of complete coupling corresponds to the state in which the receiving coil 16 and the supplying coil 103 are positioned with respect to each other.

If the results of the determinations in steps S12 and S13 are that coupling is incomplete, but a timeout has not been reached, the vehicle controller 20 returns the process to step S4. Also, if a timeout is reached, the vehicle controller 20 issues a request to stop the weak excitation to the ground equipment by wireless communication via the rectifier internal controller 18 (step S14). With this arrangement, the weak excitation of the supplying coil 103 ends, and the wireless charging changeover process ends.

Also, if the result of the determination in step S12 is that coupling is complete, the vehicle controller 20 causes the vehicle 1 to come to a stop, such as by notifying the driver that positioning of the receiving coil 16 is complete by display output or sound output (step S15). Next, the vehicle controller 20 starts the charging of the high-voltage battery 14 through the wireless charging unit 15 (step S16). Specifically, the vehicle controller 20 outputs a command to start charging to the rectifier internal controller 18. On the basis of this command, the rectifier internal controller 18 issues a power transmission request to the ground equipment controller 105 by wireless communication, and the ground equipment controller 105 drives the inverter 102 normally to transmit power from the supplying coil 103. By this power transmission, current is delivered from the receiving coil 16 to the rectifier 17, thereby charging the high-voltage battery 14. When charging has started, the wireless charging changeover process ends.

As above, according to the vehicle 1 of Example 1, the drive controller 20*a* that controls the driving current of the front-wheel motor 10 and the drive controller 20*b* that controls the driving current of the rear-wheel motor 12 are configured to be able to switch between a sensing control mode and a sensing-less control mode. Consequently, in the case in which normal output is obtained from the resolver 10*a* of the front-wheel motor 10, efficient drive control of the front-wheel motor 10 may be executed in the sensing control mode. On the other hand, in a case in which the output from the resolver 10*a* is abnormal, by switching to the sensing-less control mode, the driving of the front-wheel motor 10 may be controlled without using the detection output of the resolver 10*a*. The same also applies to the rear-wheel motor 12. Consequently, it is no longer necessary to magnetically shield the front-wheel motor 10 and the rear-wheel motor 12 with heavy shielding plates, making it possible to reduce the weight of the vehicle 1. Additionally, while potentially reducing the weight of the vehicle 1, it is also possible to avoid a situation in which the vehicle 1 becomes undriveable while positioning the receiving coil 16 in the wireless charging changeover process.

Furthermore, according to the vehicle 1 of Example 1, the drive controllers 20*a* and 20*b* include the rotor rotational position calculator 203, the rotor rotational position estimator 204, and the selector 205, such that the control mode is switched between the sensing control mode and the sensing-less control mode by the switching of the selector 205. According to such a configuration, it is possible to switch the control mode rapidly with little time lag, while also minimizing increases in the circuit scale of the drive controllers 20*a* and 20*b*.

Also, according to the vehicle 1 of Example 1, as illustrated in steps S9 and S11 of FIG. 3, in the case in which a resolver error occurs in the front-wheel motor 10 or the rear-wheel motor 12, the corresponding drive controller 20*a* or drive controller 20*b* is switched to the sensing-less control mode. By such a process, the drive controllers 20*a* and 20*b* are switched to a suitable control mode according to the output of the resolvers 10*a* and 12*a*, and the front-wheel motor 10 or the rear-wheel motor 12 may be driven.

Also, according to the vehicle 1 of Example 1, in the wireless charging changeover process, when positioning the receiving coil 16, the control mode of the drive controller 20*a* of the front-wheel motor 10 or the drive controller 20*b* of the rear-wheel motor 12 is switched to the sensing-less control mode automatically. Specifically, the control mode of one of the drive controller 20*a* of the front-wheel motor 10 and the drive controller 20*b* of the rear-wheel motor 12 is switched to the sensing-less control mode according to the gear shift position. By such a configuration, when positioning the receiving coil 16, the front-wheel motor 10 or the rear-wheel motor 12 in which a resolver error could occur due to the influence of the weak excitation of the supplying coil 103 may be driven in the sensing-less control mode in advance. Hypothetically, in the case of switching to the sensing-less control mode after a resolver occurs, smooth travel of the vehicle 1 may be impeded in some cases. However, by the above control, an impediment to the smooth travel of the vehicle 1 may be suppressed.

As described above, according to Example 1, by using the sensing control mode, a traction motor may be driven efficiently to move the vehicle 1, and by using the sensing-less control mode, the drive controllers 20a and 20b may drive a traction motor without using the detection results of the resolvers 10a and 12a. Consequently, even in a case in which an abnormality occurs in the resolver 10a or 12a, by switching from the sensing control mode to the sensing-less control mode to drive a traction motor, a situation in which the vehicle 1 becomes undriveable may be avoided.

(Modification 1)

Figure 6:
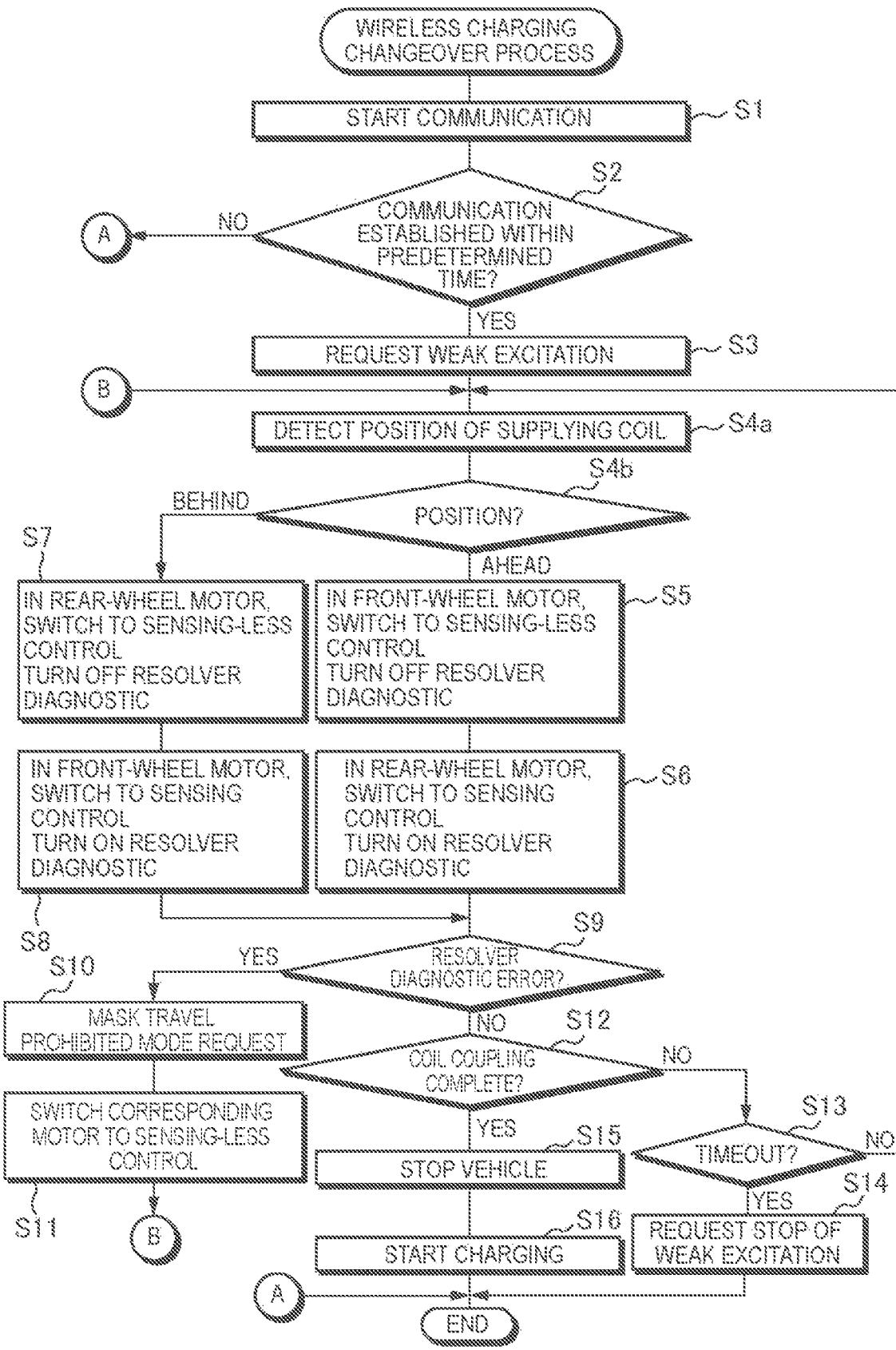
FIG. 6 is a flowchart illustrating a modification of the wireless charging changeover process.

FIG. 6 is a flowchart illustrating a modification of the wireless charging changeover process.

In Modification 1, the branch process that depends on the gear shift position in step S4 of FIG. 3 has been changed to a branch process that depends on another condition, but otherwise the processes and configuration are similar to Example 1. Only the points that differ will be described in detail.

In Modification 1, in the loop process (steps S4a to S13) executed in parallel with wireless charging changeover process driving operations, first, the vehicle controller 20 detects the position of the supplying coil 103 (step S4a). The position detection is not particularly limited, and is sufficiently executed by analysis of an image from the camera 22, for instance. Since the ground equipment has a marking or sign used for positioning, even if the supplying coil 103 cannot be detected directly from an image, the position of the supplying coil 103 can be detected by detecting the marking or sign. Next, the vehicle controller 20 determines whether the supplying coil 103 is ahead of or behind the receiving coil 16, that is, determines the relative positions of the receiving coil 16 and the supplying coil 103 (step S4b). As a result, if the supplying coil 103 is ahead, the process branches to steps S5 and S6, and if the supplying coil 103 is behind, the process branches to steps S7 and S8.

As above, according to the vehicle of Modification 1, when positioning the receiving coil 16 during the wireless charging changeover process, the control mode of the drive controllers 20a and 20b is switched according to the relative positions of the receiving coil 16 and the supplying coil 103. Consequently, even with the vehicle of Modification 1, working effects similar to Example 1 are obtained. Also, when positioning the receiving coil 16 during the wireless charging changeover process, cases in which the driver drives forward or backs up the vehicle too much are anticipated. However, according to the vehicle of Modification 1, even in such cases, the drive controller 20a or 20b for the front-wheel motor 10 or the rear-wheel motor 12 that is closer to the supplying coil 103 may be switched to the sensing-less control mode automatically.

Example 2

Figure 7:
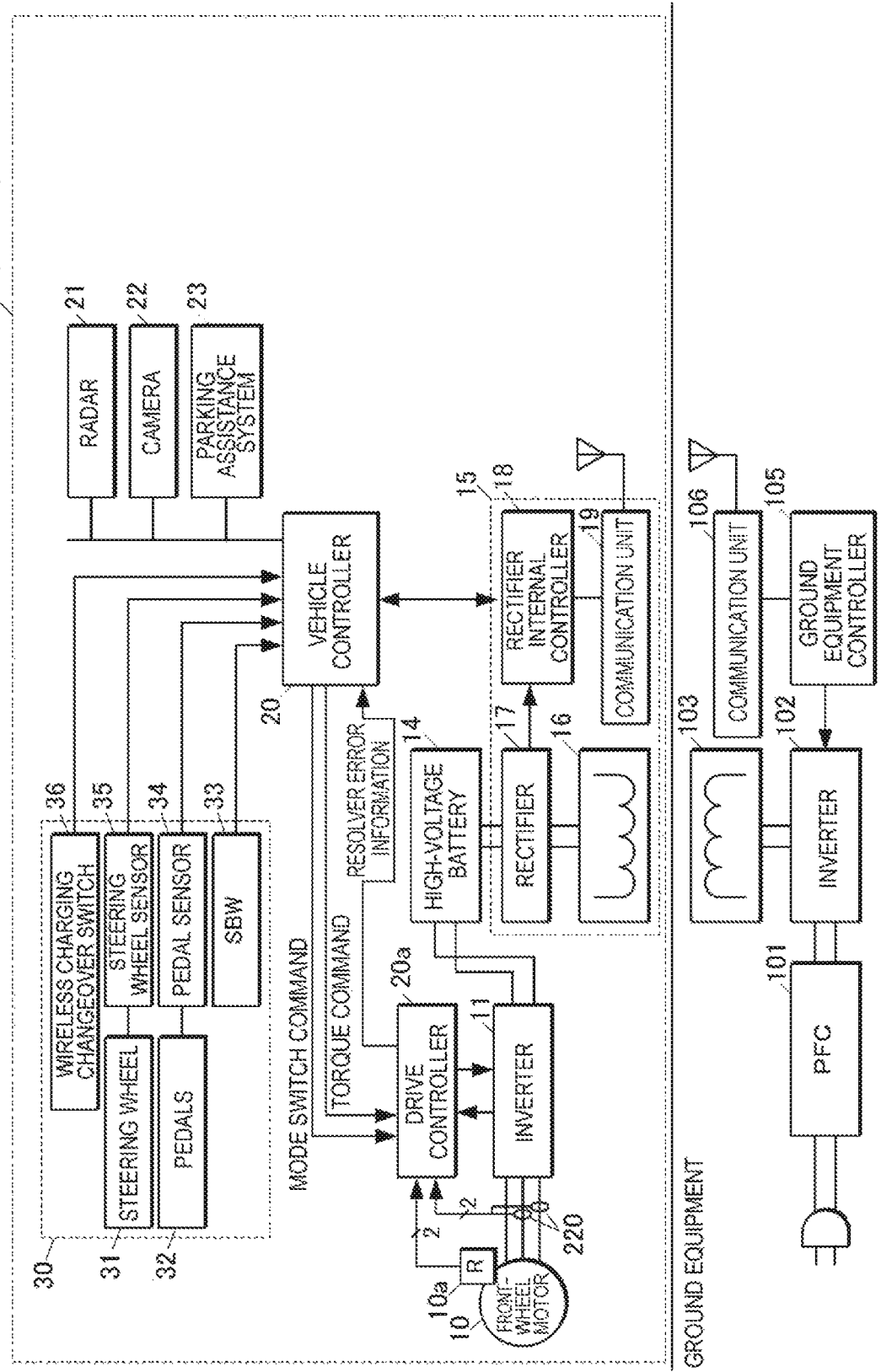
FIG. 7 is a block diagram illustrating a vehicle and ground equipment according to Example 2 of the present invention.

FIG. 7 is a block diagram illustrating a vehicle and ground equipment according to Example 2 of the present invention.

The vehicle 1A of Example 2 is a configuration in which the rear-wheel motor 12 as well as the inverter 13 and the drive controller 20b for driving the rear-wheel motor 12 have been removed from the vehicle 1 of Example 1. Hereinafter, a detailed description will be omitted for the configuration which is similar to Example 1.

The vehicle controller 20 of Example 2 is configured to switch the control mode of the drive controller 20a on the basis of resolver error information while the system of the vehicle 1A is in operation, except during the wireless charging changeover. This control action is executed in a control mode switching process described later.

Furthermore, during the wireless charging changeover, the vehicle controller 20 of Example 2 is configured to switch the control mode of the drive controller 20a to the sensing-less control mode on the basis of a trigger for starting the process of positioning the receiving coil 16. This control action is executed in a wireless charging changeover process described later. The trigger for starting the process of positioning the receiving coil 16 refers to, for instance, the driver turning on the wireless charging changeover switch 36, and also the establishment of communication between the communication unit 106 of the ground equipment and the communication unit 19 of the vehicle 1A.

In addition, a failsafe function that causes the vehicle 1A to become unmovable on the basis of resolver error information has been removed from the vehicle controller 20 of Example 2.

<Control Mode Switching Process>

Figure 8:
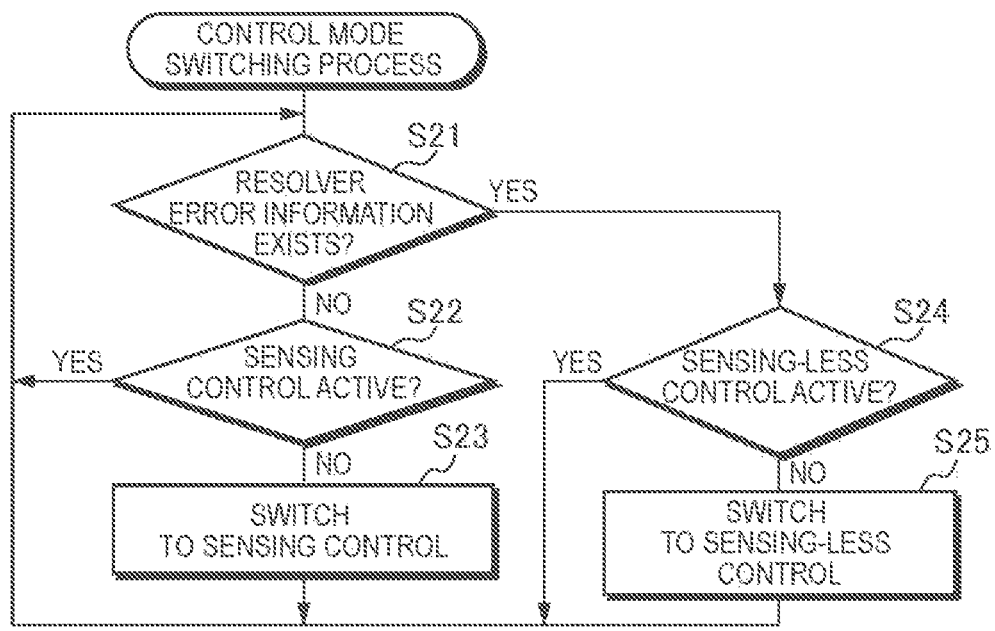
FIG. 8 is a flowchart illustrating a procedure of a control mode switching process executed by the vehicle controller according to Example 2.

FIG. 8 is a flowchart illustrating a procedure of the control mode switching process executed by the vehicle controller according to Example 2.

While the system of the vehicle 1A is in operation, the vehicle controller 20 of Example 2 continuously executes the control mode switching process in FIG. 8. In the control mode switching process, the vehicle controller 20 repeatedly determines whether resolver error information has been output from the drive controller 20a (step S21). Subsequently, if there is no output of resolver error information, the vehicle controller 20 determines whether sensing control is already active (step S22), and if so, maintains the current state. On the other hand, if sensing control is not active, the vehicle controller 20 switches the control mode of the drive controller 20a to the sensing control mode (step S23).

Also, if the result of the determination in step S21 is that there is output of resolver information, the vehicle controller 20 determines whether sensing-less control is already active (step S24), and if so, maintains the current state. On the other hand, if sensing-less control is not active, the vehicle controller 20 switches the control mode of the drive controller 20a to the sensing-less control mode (step S25). In one example, the above steps S23 and S25 correspond to one instance of a control action by a first mode controller.

By such a control mode switching process, if the output of the resolver 10a is normal, the drive controller 20a operates in the sensing control mode, and the front-wheel motor 10 is driven efficiently. Also, even if the output of the resolver 10a is abnormal due to the front-wheel motor 10 being exposed to an external magnetic field or the like, for instance, the drive controller 20a operates in the sensing-less control mode, and the driving of the front-wheel motor 10 may be continued.

<Wireless Charging Changeover Process>

Figure 9:
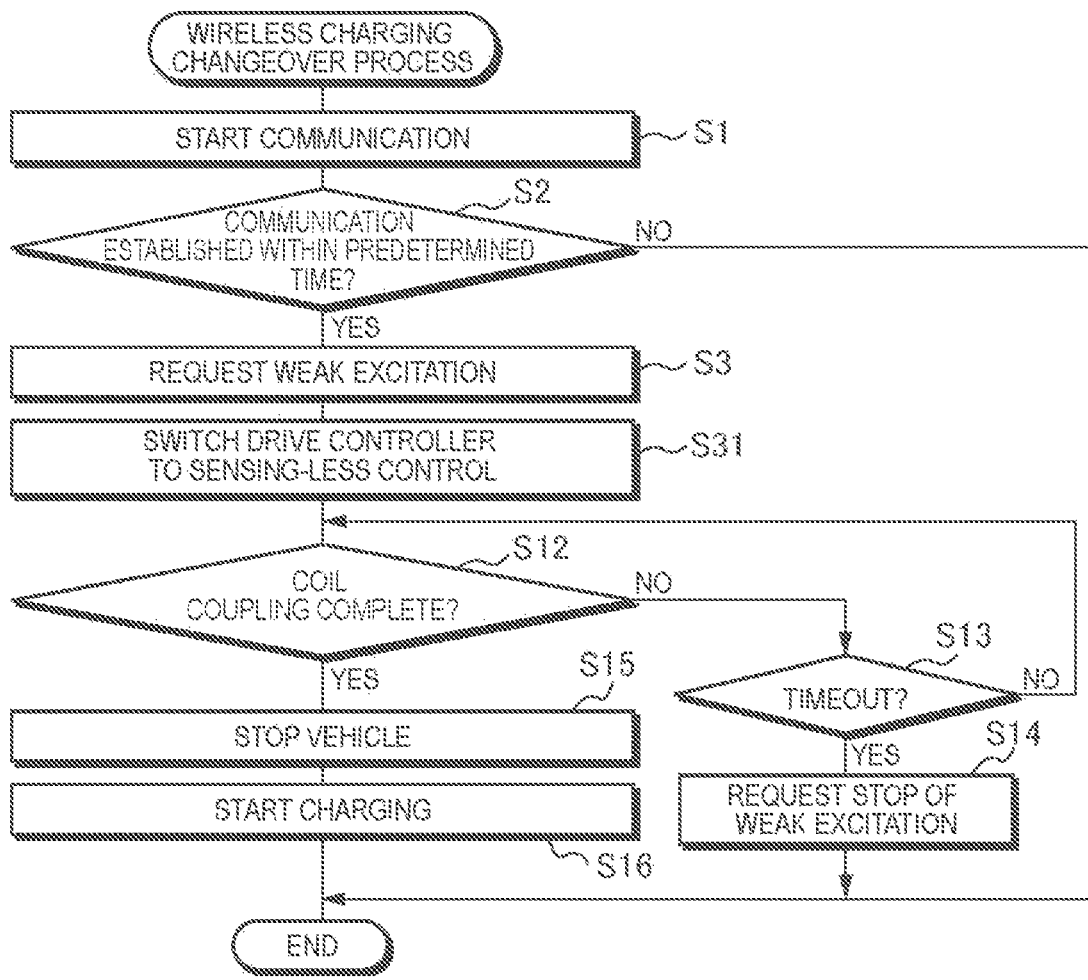
FIG. 9 is a flowchart illustrating a procedure of a wireless charging changeover process according to Example 2.
Figure 10A:
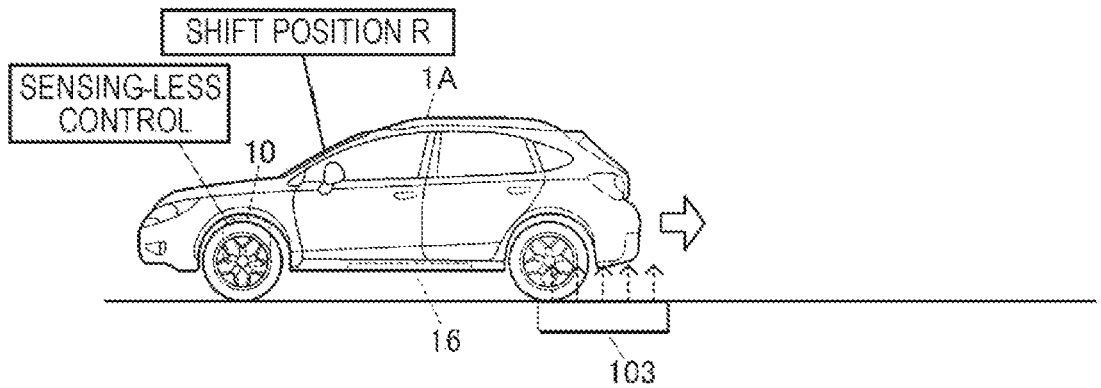
FIG. 10A is an explanatory diagram illustrating a control mode switching pattern in the wireless charging changeover process according to Example 2, and illustrates a first stage of a receiving coil positioning operation.
Figure 10B:
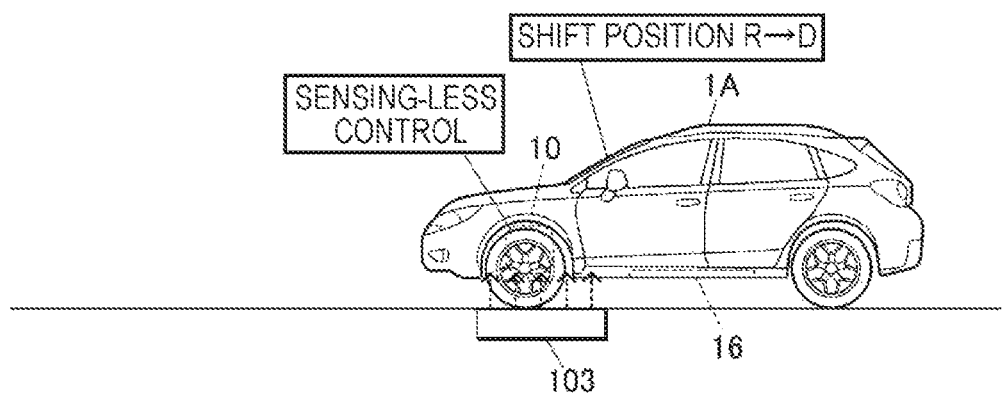
FIG. 10B is an explanatory diagram illustrating a control mode switching pattern in the wireless charging changeover process according to Example 2, and illustrates a second stage of a receiving coil positioning operation.
Figure 10C:
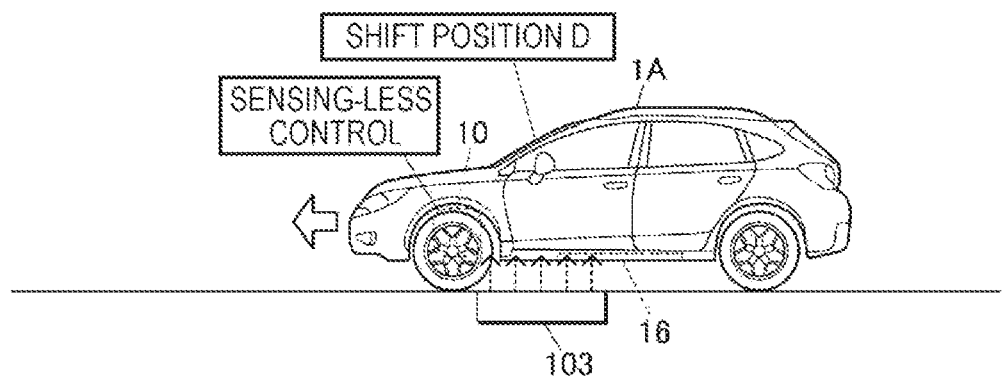
FIG. 10C is an explanatory diagram illustrating a control mode switching pattern in the wireless charging changeover process according to Example 2, and illustrates a third stage of a receiving coil positioning operation.
Figure 10D:
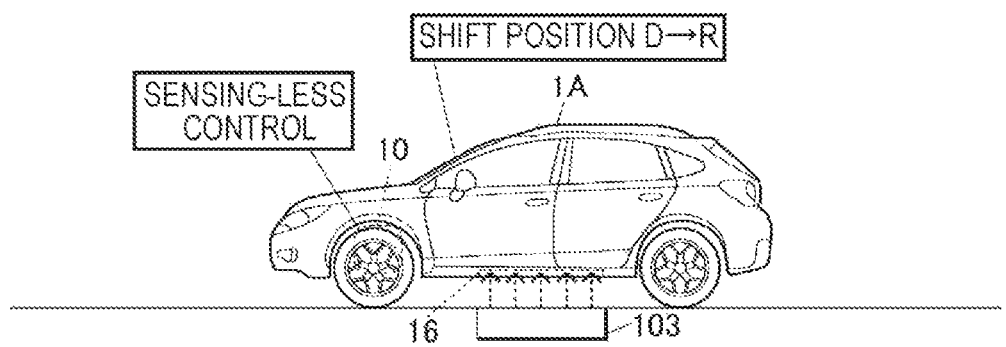
FIG. 10D is an explanatory diagram illustrating a control mode switching pattern in the wireless charging changeover process according to Example 2, and illustrates a fourth stage of a receiving coil positioning operation.

Next, the wireless charging changeover process executed by the vehicle controller 20 of Example 2 will be described. FIG. 9 is a flowchart illustrating a procedure of the wireless charging changeover process according to Example 2.

The wireless charging changeover process of Example 2 is started by the vehicle controller 20 due to the driver turning on the wireless charging changeover switch 36. In the wireless charging changeover process, steps S1 to S3 and steps S12 to S16 are similar to the steps of Example 1, and a detailed description will be omitted.

In the wireless charging changeover process of Example 2, in the loop process when the vehicle 1A is driven to position the receiving coil 16 with respect to the supplying coil 103, the vehicle controller 20 executes only the determination processes of step S12 and step S13. In other words, in Example 2, in this loop process, the vehicle controller 20 does not switch the control mode of the drive controller 20a, determine resolver error, and the like.

In the wireless charging changeover process of Example 2, before transitioning to the above loop process, the vehicle controller 20 switches the drive controller 20a to the sensing-less control mode (step S31). By this switching, when driving the vehicle 1A to position the receiving coil 16, the drive controller 20a operates in the sensing-less control mode, making it possible to continue the driving of the front-wheel motor 10 even if an abnormality occurs in the output of the resolver 10a. In one example, step S31 corresponds to one instance of a control action by a second mode controller.

Additionally, in the loop process of steps S12 and S13, if the vehicle controller 20 determines that the coupling between the receiving coil 16 and the supplying coil 103 is complete, or that a timeout has been reached, steps S14, S15, and S16 similar to Example 1 are executed. Subsequently, the wireless charging changeover process ends.

FIGS. 10A to 10D are explanatory diagrams illustrating a control mode switching pattern in the wireless charging changeover process according to Example 2, and illustrate a first stage to a fourth stage of a receiving coil positioning operation.

In the wireless charging changeover process of Example 2, the control mode of the drive controller 20a is switched to the sensing-less control mode on the basis of a trigger for starting the process of positioning the receiving coil 16. Additionally, when driving the vehicle 1 to position the receiving coil 16 with respect to the supplying coil 103, the front-wheel motor 10 is driven in the sensing-less control mode. In other words, as illustrated in FIGS. 10A to 10D, the front-wheel motor 10 is driven in the sensing-less control mode regardless of whether the shift position of the vehicle 1A is in drive "D", reverse "R", or the like. Similarly, the front-wheel motor 10 is driven in the sensing-less control mode regardless of whether the front-wheel motor 10 is moving closer to or farther away from the weakly excited supplying coil 103 in which magnetic field is being produced.

Consequently, in the vehicle 1A of Example 2, even in the case in which the output of the resolver 10a becomes abnormal because of the magnetic field in the weakly excited supplying coil 103 while positioning the receiving coil 16, the driving of the front-wheel motor 10 likewise may be continued to position the receiving coil 16.

As above, according to the vehicle 1A of Example 2, during normal travel other than the wireless charging changeover, the control mode of the drive controller 20a is switched to the sensing-less control mode on the basis of a resolver error occurring. Consequently, if the output of the resolver 10a is normal, the front-wheel motor 10 may be driven efficiently in the sensing control mode. Also, even if the output of the resolver 10a becomes abnormal, the front-wheel motor 10 may be driven in the sensing-less control mode to continue the travel of the vehicle 1.

Also, according to the vehicle 1A of Example 2, during the wireless charging changeover, the control mode of the drive controller 20a is switched to the sensing-less control mode. Consequently, even if the front-wheel motor 10 is exposed to the magnetic field of the weakly excited supplying coil 103 or if the front-wheel motor 10 escapes such a state, the control mode of the drive controller 20a is not switched. With this arrangement, the vehicle 1A may be driven smoothly to carry out the positioning of the receiving coil 16.

The foregoing describes examples of the present invention. However, the present invention is not limited to the above examples. For instance, in the above examples, a configuration in which the driver performs driving operations to move the vehicle when positioning the receiving coil with respect to the supplying coil is described as an instance, but the parking assistance system 23 may also execute automatic driving to perform the positioning, for instance. Also, in the above examples, the operation of the wireless charging changeover switch 36 by the driver is illustrated as one condition of the trigger for starting the step of positioning the receiving coil 16. However, for instance, the vehicle controller 20 detecting that the vehicle is close to the ground equipment may also be treated as one condition of the trigger for starting the step of positioning the receiving coil. Furthermore, in addition to this detection, the vehicle reaching a low speed that indicates coming to a stop or parking may also be treated as one condition of the trigger for starting the step of positioning the receiving coil. To detect that the vehicle is positioned close to the ground equipment, it is sufficient for the vehicle controller 20 to measure the position of the vehicle 1 by Global Positioning System (GPS) or the like, for instance, and check the measured position against preregistered position data about the ground equipment. Alternatively, by capturing the surroundings of the vehicle 1 with a camera and recognizing the ground equipment by image recognition, it may be determined that the vehicle controller 20 has entered the vicinity of the ground equipment.

Also, Example 2 illustrates a configuration in which a single front-wheel motor is provided as the traction motor, but the vehicle 1A of Example 2 may also be provided with a single rear-wheel motor as the traction motor, or with multiple traction motors at multiple locations in the vehicle. In addition, Example 1 and Example 2 do not illustrate a motive power source other than traction motors, but a vehicle according to an example may also be provided with a separate internal combustion engine.

Also, the above examples illustrate a method of switching the source of the rotor rotational position θ between one of a rotor rotational position calculator and a rotor rotational position estimator as the method of switching the control mode of the driving current of the traction motor between a sensing control mode and a sensing-less control mode. However, the method of switching the control mode may also be configured as a method in which, for instance, a first drive controller that controls the driving current by using the output of a resolver and a second drive controller that controls the driving current by estimating the rotor rotational position without using the output of a resolver are provided, and the control mode in which to operate is switched by switching between these drive controllers.

Also, Example 1 above illustrates a configuration that, when setting the driving mode of a traction motor (the front-wheel motor 10 or the rear-wheel motor 12) to the sensing-less control mode, switches off the resolver diagnostic in the same traction motor. However, for instance, by turning off a failsafe control that puts the vehicle 1 into an unmovable state when a resolver error occurs, the process of switching off the resolver diagnostic may be omitted.

Additionally, the above examples illustrate a configuration in which the vehicle controller 20 outputs the torque command and the drive controller mode switch command, while the rotor rotational position calculator 203 of the drive controller 20*a* executes the resolver diagnostic. However, each of these processes may be executed by a single electronic control unit (ECU), executed individually by multiple ECUs, or executed through the cooperation of multiple ECUs. Otherwise, the details indicated in the examples are appropriately modifiable within a range that does not depart from the gist of the invention.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle comprising:
    a traction motor comprising a rotational position sensor configured to detect a rotational position of a rotor magnetically;
    a drive controller configured to control a driving current output to the traction motor, wherein the drive controller is able to switch a control mode of the driving current between a sensing control mode configured to control the driving current by using a detection result from the rotational position sensor and a sensing-less control mode configured to control the driving current without using a detection result from the rotational position sensor;
    a battery configured to supply a power to the traction motor;
    a receiving coil configured to receive a power that charges the battery from a supplying coil of a piece of ground equipment wirelessly; and
    a first mode controller that switches the control mode of the drive controller from the sensing control mode to the sensing-less control mode when the receiving coil is being positioned with respect to the supplying coil.

2. The vehicle according to claim 1, further comprising:
    a rotor rotational position calculator configured to calculate a rotational position of the rotor on a basis of a detection result from the rotational position sensor;
    a current sensor configured to detect a magnitude of the driving current;
    a rotor rotational position estimator configured to estimate a rotational position of the rotor on a basis of a detection result from the current sensor; and
    a selector configured to switch between an output of the rotor rotational position calculator and an output of the rotor rotational position estimator, wherein
    the control mode of the driving current is switched by the switching of the selector.

3. The vehicle according to claim 2, further comprising:
    a second mode controller configured to switch from the sensing control mode to the sensing-less control mode on a basis of a diagnostic result from the rotational position sensor becoming an error.

4. The vehicle according to claim 1, further comprising:
    a second mode controller configured to switch from the sensing control mode to the sensing-less control mode on a basis of a diagnostic result from the rotational position sensor becoming an error.

5. The vehicle according to claim 1, wherein when the receiving coil is being positioned with respect to the supplying coil, the first mode controller switches the control mode of the drive controller according to a shift position of the vehicle or relative positions of the receiving coil and the supplying coil.

6. The vehicle according to claim 5, wherein
    the traction motor comprises a front-wheel motor that drives front wheels, and a rear-wheel motor that drives rear wheels, and
    when the receiving coil is being positioned with respect to the supplying coil, the first mode controller switches one of a control mode of a driving current of the front-wheel motor and a control mode of a driving current of the rear-wheel motor to the sensing-less control mode.

7. The vehicle according to claim 1, wherein
    the traction motor comprises a front-wheel motor that drives front wheels, and a rear-wheel motor that drives rear wheels, and
    when the receiving coil is being positioned with respect to the supplying coil, the first mode controller switches one of a control mode of a driving current of the front-wheel motor and a control mode of a driving current of the rear-wheel motor to the sensing-less control mode.

* * * * *